United States Patent [19]

Albritton et al.

[11] Patent Number: 4,573,912
[45] Date of Patent: Mar. 4, 1986

[54] SPACE HEATER

[75] Inventors: Charles W. Albritton, Hermitage; William N. Powis, Sharpsville, both of Pa.; William M. Graham, Poland, Ohio

[73] Assignee: ITT Corporation, New York, N.Y.

[21] Appl. No.: 624,648

[22] Filed: Jun. 26, 1984

[51] Int. Cl.⁴ .................... F24H 1/00; F24H 3/02; G05D 23/00
[52] U.S. Cl. .................. 432/222; 126/110 C; 236/13
[58] Field of Search ............... 432/222, 47, 37; 126/110 A, 110 C; 236/13

[56] References Cited

U.S. PATENT DOCUMENTS

| 3,406,904 | 10/1968 | Muzzi et al. | 236/13 |
| 4,294,403 | 10/1981 | Ammons et al. | 236/13 |
| 4,429,679 | 2/1984 | Dirkes | 126/110 A |

Primary Examiner—John J. Camby
Attorney, Agent, or Firm—Laff, Whitesel, Conte & Saret

[57] ABSTRACT

A direct air heater using the air to be heated as combustion air includes means for maintaining a constant flow of air across the burner. The heater also includes means for recirculating inside air and means for controlling the flow of inside air, preferably, to maintain a constant pressure in the space being heated.

13 Claims, 1 Drawing Figure

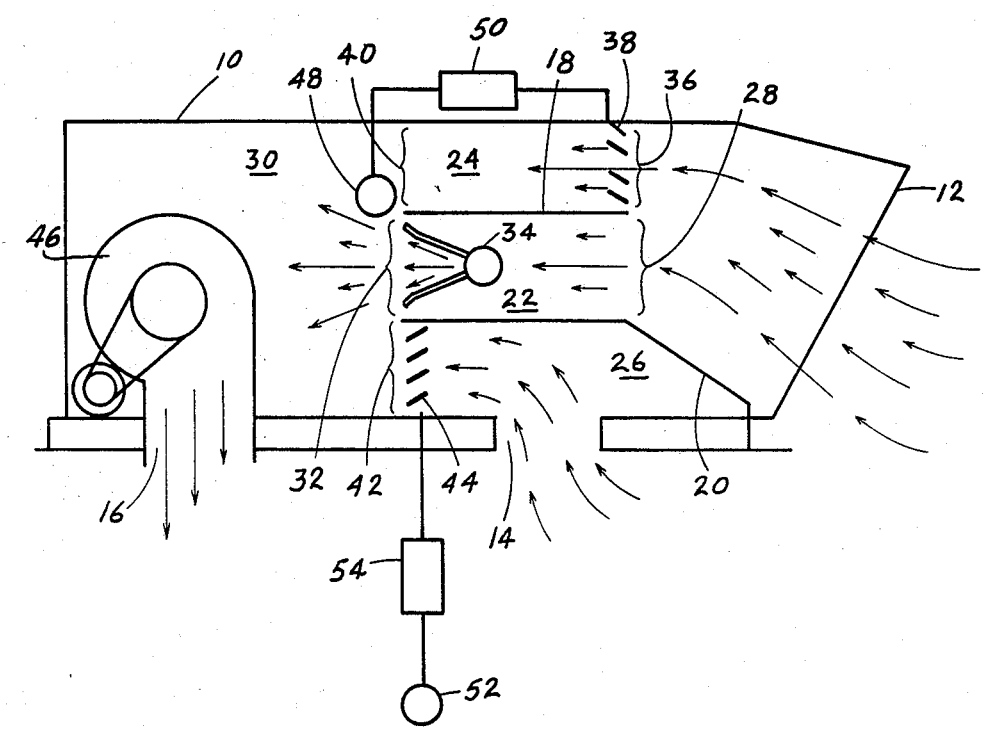

SPACE HEATER

BACKGROUND OF THE INVENTION

This invention relates to space heaters and, more particularly, to space heaters of the direct air combustion type that provide for recirculation of indoor air and for the bypass of some of the fresh air drawn over the burner.

An example of a space heater of this type is disclosed in U.S. Pat. No. 4,429,679 issued Feb. 7, 1984 to James V. Dirkes. The space heater disclosed in this patent includes a direct air burner suspended in a first air passageway or chamber located adjacent to a second air passageway or chamber. Both chambers communicate with a mixing chamber in which is located a blower that discharges air through a discharge opening into the building to be heated. The first chamber has a fresh air inlet opening that is provided with an adjustable damper that is open when the heater is operating and closed when it is not and that communicates with a fresh air intake. The second chamber has a fresh air inlet provided with adjustable dampers and it also communicates with the fresh air intake. The second chamber also has an indoor air inlet provided with adjustable dampers and this inlet communicates with the inside of the building being heated.

The blower pulls the air it discharges from the outside and also recirculates some of the indoor air. Safe operation of the space heater requires that a minimum of 20% of the air discharged into the building be drawn over the direct air burner to insure complete fuel combustion. The remaining 80% of the air discharged into the building is a complementary composite of fresh, unheated air and recirculated indoor air pulled through the second chamber. By providing the complementary composite, the air pressure inside the building can be maintained higher than the outside air pressure to prevent infiltration of cold air into the building.

The complementary relationship between the fresh unheated air and the recirculated indoor air is accomplished by conventional mechanical interconnecting means associated with the adjustable dampers in the second chamber inlet openings. The mechanical interconnecting means is arranged such that as one damper opens, the other closes and it is controlled by a pressure sensor inside the building.

Space heaters of the type disclosed in the Dirkes patent cannot account for variations in air flow over the burner. Such variations can result from changes in outside air pressure caused by changes in the wind, changes in recirculation flow caused by closing or obstructing the recirculation ductwork and variations in supply air through over-pressurization inside the building or the throttling of supply air volume.

SUMMARY OF THE INVENTION

It is an object of this invention, therefore, to provide a space heater of the type noted that can accommodate for changes in both indoor and outdoor conditions.

This and other objects are accomplished by providing a space heater comprising a housing having a discharge opening, an outside air inlet opening and an inside air inlet opening. The space heater further comprises a blower causing air to flow through said housing from the inlet openings to the discharge opening and a direct air burner upstream of the discharge opening and downstream of the outside air inlet opening. A first adjustable damper is provided for bypassing some of the air from the outside air inlet opening around the burner or to direct more of this air across the burner and second adjustable damper means is provided for varying the amount of air flow from the inside air inlet opening to the discharge opening, that is, the recirculated inside air. First control means is associated with the first damper means and operates this damper means to maintain a constant flow of air across the burner and second control means is associated with the second damper means and operates this damper means to control the flow of inside air.

BRIEF DESCRIPTION OF THE DRAWING

For a better understanding of the invention, reference is made to the following description of a preferred embodiment thereof taken in conjunction with the figure in the accompanying drawing which FIGURE is a sectional view of a space heater in accordance with this invention.

DETAILED DESCRIPTION OF THE PREFERRED EMBODIMENT

The space heater illustrated in the drawing includes a housing 10 having an outside air inlet 12 communicating with the outside of a building, an inside air inlet 14 communicating with the inside of the building being heated and an air discharge opening 16 also communicating with the inside of the building being heated. Inside the housing 10 there are partitions 18 and 20 forming chambers 22, 24 and 26. One end of the chamber 22 is an air inlet 28 and communicates with the outside air inlet 12; the other end communicates with a mixing chamber 30 and provides a profile opening 32 of fixed dimension. In the profile opening 32 is a direct air burner 34 located in the air flow path to heat the air flowing through the chamber 22. A direct air burner is one that uses a fuel and the air being heated for combustion. Thus, the air being heated passes over an open flame. These burners are usually gas fed and their construction and fuel feeding system are well known in the art.

One end of the chamber 24 is an air inlet 36 that also communicates with the air inlet opening 12 and this inlet is provided with an adjustable damper assembly 38 of any conventional type. The chamber 24 communicates with the mixing chamber 30 through a profile opening 40 of fixed dimension.

The partition 20 is bent to prevent the chamber 26 from communicating with the air inlet 12, but to provide communication with the inside air inlet 14. The end of the chamber 26 adjacent the profile openings 32 and 40 forms a profile opening 42 that communicates with the mixing chamber 28 through an adjustable damper assembly 44 also of any conventional type. Thus, the profile opening 42 is variable.

An exhaust blower 46 is located in the mixing chamber 30 and draws air from the inlets 12 and 14, through the chambers 22, 24 and 26 into the mixing chamber 28 and then through the discharge opening 16 to discharge various combinations of heated and unheated outside air and recirculated, unheated indoor air. The total volume of these combinations, however, is maintained generally constant for any particular blower speed.

Control over the combinations of air discharged is provided by individual control means associated with each damper assembly 38 and 44. These control means are operative to independently set the damper assemblies 38 and 44 in their open or closed positions as well as intermediate positions therebetween. In this way the air flow discharged by the chambers 24 and 26 can be controlled. The damper assembly 38 is controlled in response to changes in the differential pressure or induced velocity pressure across the profile opening 32. This is accomplished by using a pressure or velocity sensor 48 located across or downstream from the profile opening 32 at the discharge side of the burner 34. If the sensor 48 is pressure sensing, changes in differential air pressure across the profile opening 32 are sensed; if it is velocity sensing, changes in the velocity at the discharge side of the profile opening 32 are sensed. Regardless of the type, sensor 48 senses a change in air flow across the profile opening 32 and sends a signal indicating an increase or decrease in air flow to a damper operating mechanism 50 that opens or closes the damper assembly 38 at the inlet opening of the chamber 24. The above-described arrangement is operative to maintain a constant pressure or velocity and thus pressure differential across the profile opening 32. Thus, it maintains a constant volume and velocity air flow across the burner 34. When the flow across the burner 34 reassumes its desired velocity, the sensor 48 shuts off the damper operating mechanism and the setting of the damper assembly 38 is fixed. Assuming the blower 38 is running at a constant speed, about 30% of the air discharged into the mixing chamber 28 is pulled across the burner 30 and the other 70% of the air is proportioned between the chambers 24 and 26. As is known to those skilled in the art, the air flow across the burner 34 should never fall below 20% of the air discharged into the building.

The damper assembly 44 is preferably controlled in response to the air pressure inside the building to maintain a slightly higher pressure inside the building than outside. This minimizes infiltration of cold outside air into the building. A pressure sensor 52 located inside the building senses the air pressure in the building. When there is a change, the sensor 52 sends a signal to a damper operating mechanism 54 that opens or closes the damper assembly 44. When the desired pressure is reestablished, the sensor 52 shuts off the damper operating mechanism 54 so that the setting of the damper assembly 44 is fixed. The pressure sensor 52 can be a manually adjustable controller instead of a sensor. In some instances the sensor 52 can be a thermostat so that the damper assembly 44 is temperature controlled.

If the pressure inside the building being heated decreases, for example, if exhaust fans are turned on, the sensor 52 detects the decrease and operates to close the damper assembly 44 so that less indoor air is circulated through the chamber 26 into the mixing chamber 28. Alternatively, the dampers can be adjusted manually when turning on the exhaust fans. Because of the reduced recirculated indoor air fed into chamber 28, the pressure in that chamber decreases so that the pressure drop across the burner 30 increases causing an increased velocity of the air discharging through the chamber 22. Either the lower pressure or the increased velocity is detected by the sensor 48 which operates the adjusting mechanism 50 to open the damper assembly 36 and distribute more of the fresh outside air through that chamber.

If the pressure inside the building increases, for example, if exhaust fans are turned off, the reverse of the above procedure occurs.

The damper assemblies 38 and 44 do not follow each other in the sense that they are linked together so that as one assembly opens, the other closes. The damper assemblies are independently controlled and this arrangement provides an additional flexibility and advantage. If the heater is operating and the only condition changing is the velocity of the fresh air at the inlet 12, for example, caused by an increase in the wind velocity, the velocity of the air flow across the burner 34 increases and this increase is detected by the sensor 48 which operates to open the damper assembly 36 and bypass air through that chamber. This, in turn, reduces the flow across the burner until that flow reaches its desired constant velocity. While this adjustment is made, there is no change in the setting of the damper assembly 44. However, recirculating indoor air flow is ultimately reduced because the blower 46 can only handle so much air. It takes the air from the supply of least resistance, in this case, the high velocity outside air. Accordingly, an adjustment will eventually take place in the flow of both air streams without ever changing the damper assembly 44.

If the wind velocity decreases, the reverse of the above procedure occurs. If any other changes occur to change the flow across the burner, one of these last two procedures will take place depending on whether the change is an increase or decrease.

While we have described above the principles of our invention in connection with specific apparatus, it is to be clearly understood that this description is made only by way of example and not as a limitation to the scope of our invention as set forth in the objects thereof and in the accompanying claims.

We claim:

1. A space heater comprising a housing having a discharge opening thereon, an outside air inlet opening and an inside air inlet opening, blower means for causing air to flow through said housing from said air inlet openings to said discharge opening, direct air burner means located upstream of said discharge opening and downstream of said outside air inlet opening, first adjustable damper means for bypassing some of the air from said outside air inlet opening around said burner or for directing more of this air across said burner, second adjustable damper means for varying the flow of inside air from said inside air inlet opening to said discharge opening, first control means operating said first adjustable damper means to maintain a constant flow of air across said burner, second control means operating said second adjustable damper means to control the flow of inside air.

2. A space heater in accordance with claim 1 wherein said first control means senses changes in the pressure of the air downstream of said burner and operates the first adjustable damper means to maintain said pressure substantially constant.

3. A space heater in accordance with claim 1 wherein said first control means senses changes in the velocity of the air downstream of said burner and operates the first adjustable damper means to maintain said velocity substantially constant.

4. A space heater in accordance with claim 1 wherein said second control means senses the air pressure in a space to be heated and operates said second adjustable damper means to maintain said pressure substantially constant.

5. A space heater in accordance with claim 1 wherein said second control means is manually adjustable.

6. A space heater in accordance with claim 1 wherein said second control means is a thermostat.

7. A space heater comprising a housing formed with a discharge opening, an outside air inlet opening and an inside air inlet opening; partition means located in said housing forming a mixing chamber adjacent said discharge opening, first chamber means communicating to allow the flow of air from said outside air inlet opening to said mixing chamber, and another chamber means communicating to allow the flow of air from said inside air inlet opening to said mixing chamber; direct air burner means located in said first chamber means; blower means operatively associated with said housing to cause air to flow from said air inlet openings, through said first chamber means, said another chamber means and said mixing chamber to said discharge opening; first adjustable damper means operatively associated with said first chamber means to bypass at least some of the air flowing therein around said burner or for directing more of this air across said burner; second adjustable damper means operatively associated with said another chamber for varying the flow of the inside air flowing therein; first control means operating said first adjustable damper means to maintain a constant flow of air across said burner; and second control means operating said second adjustable damper means to control the amount of air flow.

8. A space heater in accordance with claim 7 wherein said first chamber means includes a chamber in which said burner is located and a bypass chamber, said first adjustable damper means being located in said bypass chamber.

9. A space heater in accordance with claim 7 wherein said first control means senses changes in the pressure of the air downstream of said burner and operates the first adjustable damper means to maintain said pressure substantially constant.

10. A space heater in accordance with claim 7 wherein said first control means senses changes in the velocity of the air downstream of said burner and operates the first adjustable damper means to maintain said velocity substantially constant.

11. A space heater in accordance with claim 7 wherein said second control means senses the air pressure in a space to be heated and operates said second adjustable damper means to maintain said pressure substantially constant.

12. A space heater in accordance with claim 7 wherein said second control means is manually adjustable.

13. A space heater in accordance with claim 7 wherein said second control means is a thermostat.

* * * * *